US010798335B2

(12) United States Patent
Weaver

(10) Patent No.: US 10,798,335 B2
(45) Date of Patent: Oct. 6, 2020

(54) CONVERTING VARIABLE FRAME RATE VIDEO TO FIXED FRAME RATE VIDEO

(71) Applicant: Adobe Inc., San Jose, CA (US)

(72) Inventor: Dale Matthew Weaver, Wheaton, IL (US)

(73) Assignee: Adobe Inc., San Jose, CA (US)

( * ) Notice: Subject to any disclaimer, the term of this patent is extended or adjusted under 35 U.S.C. 154(b) by 96 days.

(21) Appl. No.: 15/978,984

(22) Filed: May 14, 2018

(65) Prior Publication Data

US 2019/0349549 A1 Nov. 14, 2019

(51) Int. Cl.
*H04N 7/01* (2006.01)
*H04N 19/51* (2014.01)
*H04N 19/132* (2014.01)
*H04N 13/167* (2018.01)

(52) U.S. Cl.
CPC ......... *H04N 7/0127* (2013.01); *H04N 13/167* (2018.05); *H04N 19/132* (2014.11); *H04N 19/51* (2014.11)

(58) Field of Classification Search
USPC .................................................. 375/240.01
See application file for complete search history.

(56) References Cited

U.S. PATENT DOCUMENTS

| 7,418,037 B1 * | 8/2008 | Nie | H04N 19/159 375/240.03 |
| 2009/0148058 A1 * | 6/2009 | Dane | H04N 5/145 382/251 |
| 2014/0362918 A1 * | 12/2014 | Bushell | H04N 19/172 375/240.15 |
| 2017/0235357 A1 * | 8/2017 | Leung | H04L 67/22 713/310 |
| 2017/0272755 A1 * | 9/2017 | Holcomb | H04N 19/146 |
| 2019/0104311 A1 * | 4/2019 | Amer | H04N 19/137 |

* cited by examiner

*Primary Examiner* — Christopher S Kelley
*Assistant Examiner* — Ana Picon-Feliciano
(74) *Attorney, Agent, or Firm* — SBMC

(57) ABSTRACT

Converting variable frame rate video to fixed frame rate video is described. A variable frame rate (VFR) video having source frames with varying frame durations is obtained. A fixed frame rate for the VFR video is determined. A mapping is generated which maps the source frames of the VFR video to a sequence of result frames of the fixed frame rate. To generate the mapping, a suitable source frame is chosen for each result frame using one or more mapping rules. After the mapping is generated, the mapping is adjusted to improve smoothness of motion of the VFR video by adding at least one skipped source frame to the mapping and removing at least one repeated source frame from the mapping. The VFR video is then converted into, or interpreted as, a fixed frame rate video having the determined fixed frame rate based on the adjusted mapping.

20 Claims, 14 Drawing Sheets

1100

|   | A | B | C | D | E | F | G |
|---|---|---|---|---|---|---|---|
| 1102 | 1 | 1 | 3 | 3 | 5 | 5 | 7 |
| 1104 | 1 | 2 | 3 | 4 | 5 | 6 | 7 |
| 1106 | 1 | 2 | 2 | 4 | 4 | 6 | 7 |

Fig. 11

CONVERTING VARIABLE FRAME RATE VIDEO TO FIXED FRAME RATE VIDEO

BACKGROUND

A variable frame rate (VFR) video includes video frames which do not occur at a single, fixed rate, such as 25 frames per second. Instead, a duration of each individual video frame can be arbitrarily long or short. In order to manipulate or edit a variable frame rate video in a video system, such as a video editing system or other media processing system, the VFR video must first be modified to map the irregular source frames of the VFR video to a fixed, regular frame rate. While it may be possible to employ a sophisticated motion analysis and estimation system to synthesize interpolated source frames of a VFR video to be presented at the fixed output frame rate, such a system is computationally intensive and may also introduce its own class of undesirable visual or motion artifacts.

Some conventional systems essentially ignore the VFR problem by simply running playback of the VFR video at close to the average frame rate of the VFR video and assigning one output frame time to each separate input frame. Doing so, however, ignores audio synchronization of the VFR video frames to the corresponding audio, and thus a video frame of the converted VFR video may be presented many seconds before or after the presentation of its corresponding audio. Even apart from the presence or consideration of synchronized audio, this drift in presentation time may be undesirable because of visual attributes of the media. For example, without correction the second hand of a clock may appear to run much faster or much slower than expected.

Another conventional system runs playback of the VFR video at a constant rate (for example, a rate close to the average video frame rate of the VFR source) while also maintaining audio sync to select the "best" source frame (generally the one that gives the best perceived audio synchronization) for each presentation frame time. This necessarily results in repeating and/or skipping source frames. Depending on the source, this straightforward processing can result in a jerky or choppy artifact as some frames are repeated and other frames are skipped.

Another conventional solution selects a high frame rate, in the neighborhood of the maximum frame rate found in the source VFR video (that is, the inverse of the duration of the shortest frame in the file). This conventional system preserves smoothness of motion in that few or no source frames will be skipped, and can also preserve audio synchronization by repeating many source frames if necessary, but this approach is unsatisfying because the media processing system will require additional processing power to run at a faster frame rate, as well as additional memory to pass repeated source frames through a rendering and presentation pipeline. Also, if such a system chooses a frame rate to make certain that every possible frame is synchronized perfectly in the presentation pipeline, the resulting frame rate could be as high as 27 million frames per second or higher.

SUMMARY

To overcome these problems, converting variable frame rate video to fixed frame rate video techniques are leveraged in a digital medium environment. A variable frame rate (VFR) video having source frames with varying frame durations is obtained. A fixed frame rate for the VFR video is determined. A variety of different approaches may be utilized to determine the fixed frame rate. In some cases, the fixed frame rate is determined based on the VFR video, such as by computing the fixed frame rate based on an average frame rate of the VFR video, the highest or lowest frame rate found within the VFR video, a maximum or minimum N-sample moving average frame rate within the VFR video, and so forth. Alternately, a frame rate may be selected for the VFR video out of a fixed set of options (e.g., 29.97 fps, 60 fps, or 240 fps) based on the supported or preferred frame rates within a particular digital medium environment.

A mapping is generated which maps the source frames of the VFR video to a sequence of result frames of the fixed frame rate. To generate the mapping, a suitable source frame is chosen for each result frame using one or more mapping rules. After the mapping is generated, the mapping is adjusted to improve smoothness of motion of the VFR video by adding at least one skipped source frame to the mapping and removing at least one repeated source frame from the mapping. The VFR video is then converted into a fixed frame rate video having the fixed frame rate based on the adjusted mapping.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 11 illustrates an example 1100 of adjustments made to a mapping.

DETAILED DESCRIPTION

Overview

Figure 1:
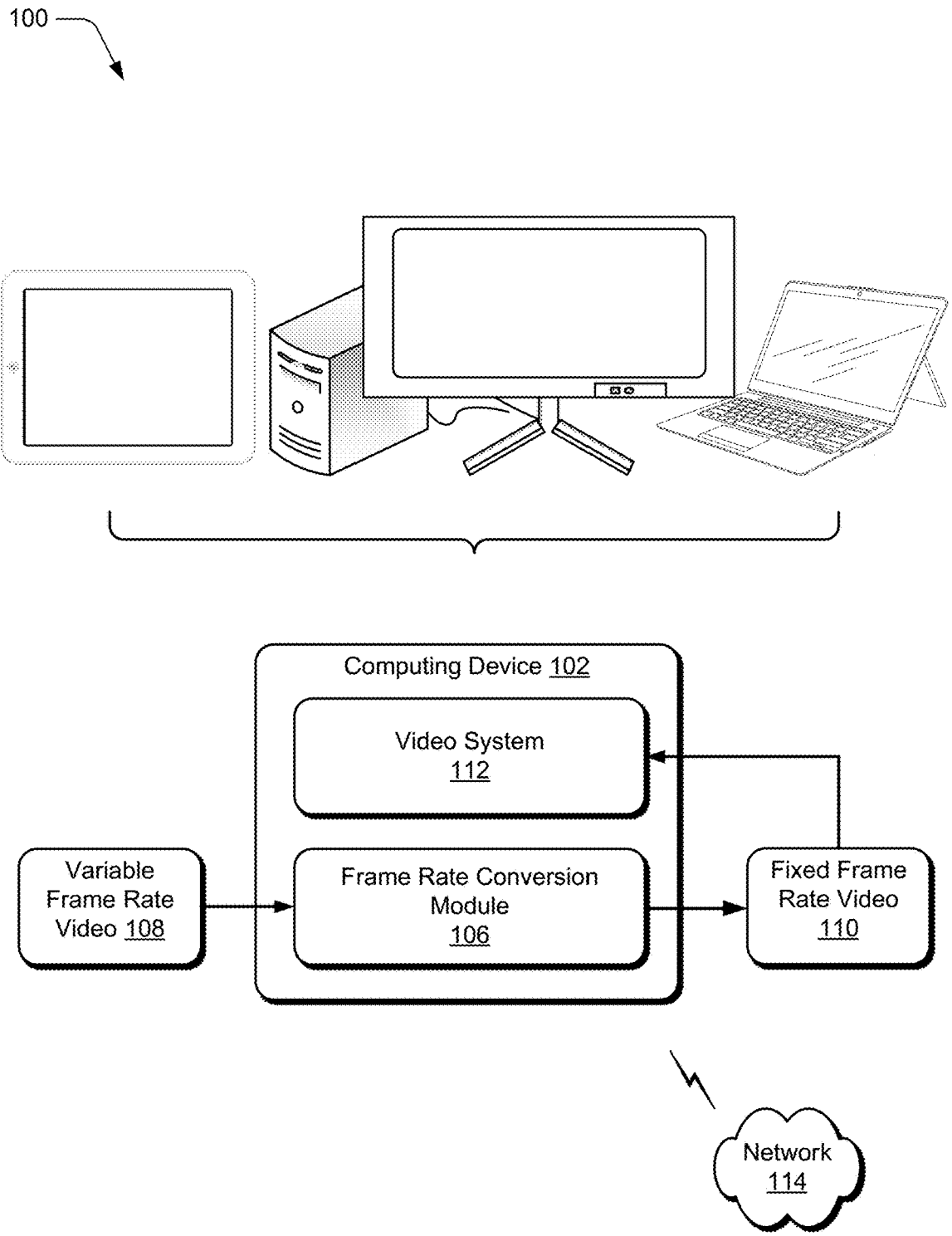
FIG. 1 is an illustration of an environment in an example implementation that is operable to employ techniques described herein.

To overcome these problems, converting variable frame rate video to fixed frame rate video techniques are leveraged in a digital medium environment. The described techniques convert a variable frame rate (VFR) video into a fixed frame rate video which preserves audio synchronization and smooth video motion, without resorting to a high fixed frame rate or computationally intensive methods.

In one or more implementations, a VFR video having source frames with varying frame durations is obtained, and an optimal fixed frame rate for the VFR video is determined. Notably, the frame rate for a video corresponds to the inverse of a duration of each frame. For example, a fixed frame rate of 60 frames/second (fps) would have a frame duration, of each frame, of 1/60 of a second. Thus, "high" fixed frame rates result in shorter frame durations, while "low" fixed frame rates result in longer frame durations.

A variety of different approaches may be utilized to determine the fixed frame rate. In some cases, the fixed frame rate is determined based on the VFR video, such as by computing the fixed frame rate based on an average frame rate of the VFR video, the highest or lowest frame rate found within the VFR video, a maximum or minimum N-sample moving average frame rate within the VFR video (where N is a fixed number of frames or a fixed percentage of the total frame count of the video media), or a value chosen using visual or other attributes of the video media.

Alternately, a frame rate may be selected for the VFR video out of a set of fixed frame rate options (e.g., 29.97 fps, 60 fps, or 240 fps) based on the supported or preferred frame rates within a particular digital medium environment. This selection of the particular fixed frame rate option may be based on user preferences and/or a computation of the closest available option to the ideal frame rate, a floor or ceiling function of the frame rate among the available fixed rates, the option that is closest (or determined by a floor or ceiling function) within a certain tolerance of an integer or other convenient multiple or factor of the frame rate, and so forth.

A mapping is generated by mapping the source frames of the VFR video to a sequence of result frames of the determined fixed frame rate. The duration of each result frame is fixed and is based on the determined fixed frame rate. For example, the duration of each result frame can be calculated as the inverse of the determined fixed frame rate. To generate the mapping, the source frames are mapped, frame by frame, to each undetermined result frame.

The mapping may occur according to a variety of different mapping rules. One such mapping rule selects the source frame of the VFR video which occupies a longest duration relative to a duration of the target result frame of the mapping. However, in some cases the duration of a source frame relative to a target result frame may not be as important of a consideration for synchronization as its start time. Thus, in another mapping approach, the mapping can be generated based on the start time of the source frame without regard to the duration. For instance, one mapping rule selects the source frame with a start time that is closest to the respective start time of the target result frame. Generally, this mapping approach may result in smoother motion with fewer skipped or repeated source frames than a mapping approach which selects the source frame based on duration relative to the target result frame. Another such mapping rule selects the closest source frame from the past (in terms of difference between start points) unless the closest source frame from the future is nearer and has a timing error that is less than a chosen tolerance (e.g., one half of one fixed frame duration). However, the mapping may be generated according to a variety of different mapping rules, including those mentioned above or a combination of the rules mentioned above, without departing from the techniques described herein.

Regardless of the mapping approach used to generate the initial mapping, certain source frames from the VFR video will be skipped unless the fixed frame rate is high enough, and certain source frames from the VFR video will be chosen for repetition unless the fixed frame rate is low enough. In general, when the source frames in a localized area have an average frame rate higher than the chosen fixed frame rate, some of these frames must be skipped to reduce timing error (e.g., to preserve acceptable audio synchronization), and if a localized area has frames with an average frame rate lower than the chosen fixed frame rate, some frames must be repeated to reduce timing error.

Thus, unlike conventional solutions, the described techniques utilize a second processing step which can adjust the "best" frame-by-frame source selection method to allow for smoother motion, while still considering audio synchronization and processing load within specified tolerances. Not only does this adjustment process require low processing power, but it also results in an adjusted mapping for smoother playback at a lower frame rate, and hence uses correspondingly fewer memory and processing resources than conventional systems.

Accordingly, after the initial mapping is generated, the mapping is adjusted to improve smoothness of motion of the VFR video. In one or more implementations, the mapping is adjusted by adding a skipped source frame, removing a repeated source frame, and shifting sequential result frames of the mapping between a skip location of the skipped source frame in the mapping and a repeat location of the repeated source frame in the mapping. To do so, the mapping is scanned to locate a skipped source frame at a skip location in the mapping. When a skipped source frame is found, the mapping is scanned from the skip location to find a repeated source frame. If a repeated source frame is found, then a timing error is computed which would occur if the skipped source frame were added at the skip location, the repeated source frame were removed, and sequential result frames were shifted between the skip location of the skipped source frame in the mapping and the repeat location of the repeated source frame in the mapping. Then, if the timing error is below an acceptable threshold, the mapping is adjusted by adding the skipped source frame at the skip location of the mapping, removing the repeated source frame from the mapping, and shifting the sequential result frames between the skip location of the skipped source frame in the mapping and the repeat location of the repeated source frame in the mapping. The adjusted mapping, formed by iteratively applying this technique, is then used to convert the VFR video into a fixed frame rate video having the determined fixed frame rate (as described above) and based on the adjusted mapping. In some cases, "converting" the VFR video into a fixed frame rate involves a physical conversion of the video file, while in other instances the conversion results in the VFR video being interpreted as a fixed frame rate video having the determined fixed frame rate using the adjusted mapping. In other words, the adjusted mapping is applied so that the VFR video may, using that mapping, be stored, transmitted, presented, or manipulated as fixed frame rate video.

By using both an initial mapping process and a subsequent adjustment process, the described techniques provide smoother motion of the converted video while at the same time enabling the video system to run at a lower fixed frame rate, thereby conserving memory and processing resources. Furthermore, the described techniques preserve audio synchronization between the converted fixed frame rate video and the original audio within a given tolerance, while also minimizing image artifacts which often result from computationally intensive motion estimation techniques.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 14.

The computing device 102 is illustrated as including a frame rate conversion module 106 which is representative of functionality to convert variable frame rate (VFR) video 108 into fixed frame rate video 110 which may be processed by a video system 112. As described herein, a fixed frame rate video 110 may be a literal compressed or uncompressed video media object residing in memory or storage, a highly virtualized object involving a description of how to access VFR video 108, intermediate representations within computing device 102 usable to play, present, or interpret the VFR video 108 at a fixed frame rate, or any combination thereof.

Video system 112 may include a video playback system, a video editing system, and/or a video effects system that can play back, edit, or modify the converted fixed frame rate video 110. For example, the video system 112 may include a video editing application which represents functionality of the computing device 102 to create, edit, and/or modify digital videos using a variety of different video editing or video effects techniques. Such a video editing application may facilitate other media processing, video editing, or video effects operations without departing from the spirit or scope of the techniques described herein. As described herein, the VFR video 108 may include visual video without associated audio, or visual video with associated audio that is synchronized with the visual video. Although illustrated as implemented locally at the computing device 102, functionality of the illustrated frame rate conversion module 106 may also be implemented in whole or part via functionality available via a network 114, such as part of a web service or "in the cloud."

Figure 2:
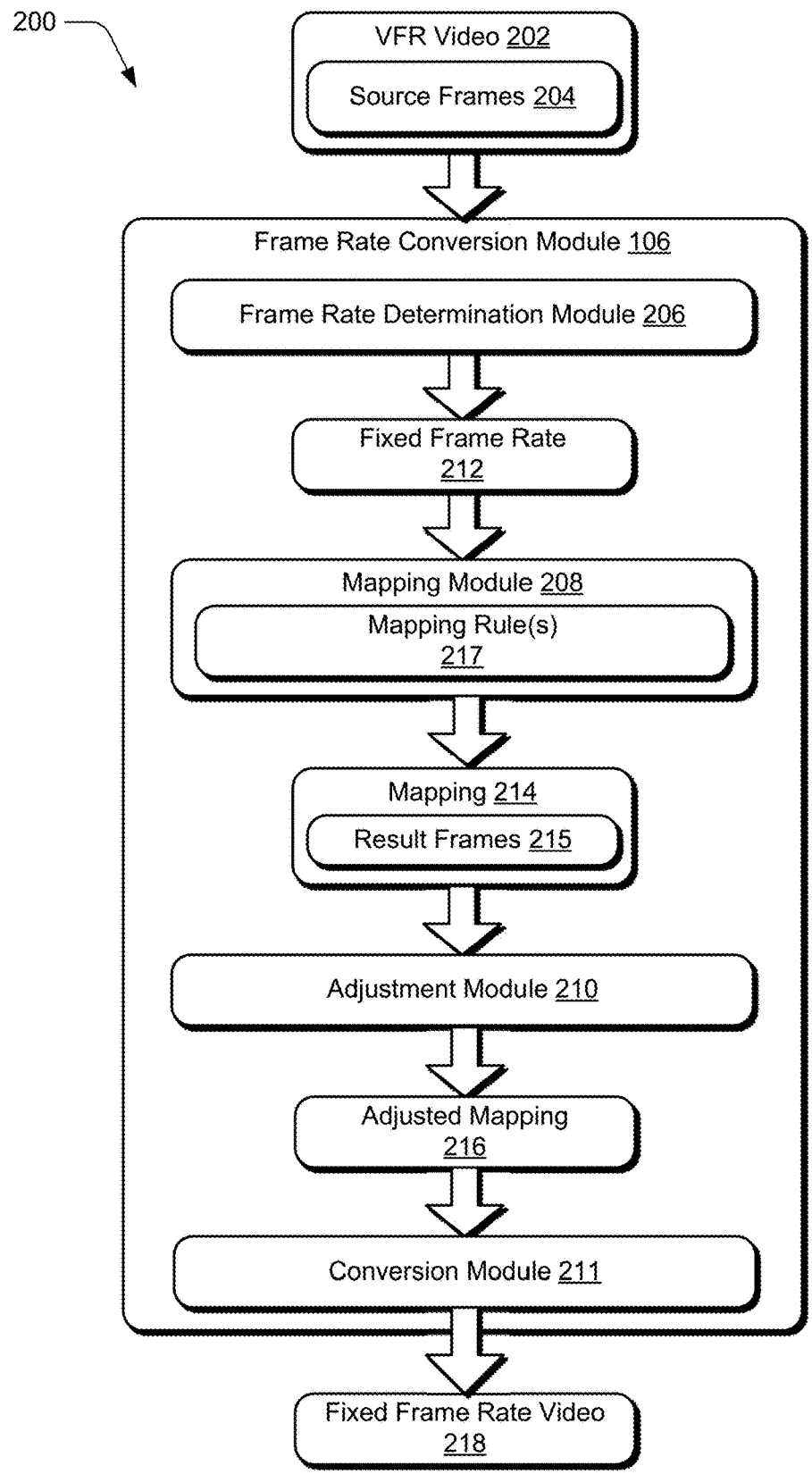
FIG. 2 depicts a system in an example implementation showing the frame rate conversion module of FIG. 1 in more detail.

FIG. 2 depicts a system 200 in an example implementation showing the frame rate conversion module of FIG. 1 in more detail. In example 200, the frame rate conversion module 106 is depicted as obtaining VFR video 202 with a variable frame rate. Broadly speaking, VFR video 202 includes a sequence of source frames 204 with a variable frame rate. In other words, rather than each source frame having a fixed duration, the source frames 204 have varying frame durations which causes the frame rate of the VFR video 202 to be variable.

In the illustrated example 200, the frame rate conversion module 106 is depicted with a frame rate determination module 206, a mapping module 208, an adjustment module 210, and a conversion module 211. The frame rate determination module 206 represents functionality of the frame rate conversion module 106 to determine a fixed frame rate 212 for the VFR video 202. The frame rate determination module 206 determines the fixed frame rate 212 to be used by module 106 to convert the VFR video 202 into the fixed frame rate video 218 of the fixed frame rate 212. A variety of different approaches may be utilized by the frame rate determination module 206 to determine the fixed frame rate 212.

In some cases, the fixed frame rate is determined based on the VFR video, such as by computing the fixed frame rate based on an average frame rate of the VFR video, the highest or lowest frame rate found within the VFR video, a maximum, minimum (or other suitable value based on statistical analysis) of an N-sample moving average frame rate within the VFR video (where N is a fixed number of frames or a fixed percentage of the total frame count of the video media), or a value chosen using visual or other attributes of the video media.

To determine the fixed frame rate 212 based on the highest frame rate (e.g., the source frame 204 with the shortest duration), the frame rate determination module 206 scans the source frames 204 to identify the source frame with the shortest duration. Then, the frame rate determination module 206 computes the inverse of the duration of the source frame 204 to determine the fixed frame rate 212. Doing so results in a high frame rate which reduces timing error and maximizes smooth motion. However, as discussed throughout, selecting such a high fixed frame rate 212 results in the need for high processing resources.

To determine the fixed frame rate 212 based on an average frame rate of the VFR video 202, the frame rate determination module 206 first computes the average frame duration from each source frame 204 of the VFR video 202. Then, the frame rate determination module 206 computes the inverse of the average frame duration to determine the fixed frame rate 212.

Alternately, a frame rate may be selected for the VFR video out of a set of fixed frame rate options (e.g., 29.97 fps, 60 fps, or 240 fps) based on the supported or preferred frame rates within a particular digital medium environment. This selection of the particular fixed frame rate option may be based on user preferences and/or a computation of the closest available option to the ideal frame rate, a floor or ceiling function of the frame rate among the available fixed rates, the option that is closest (or determined by a floor or ceiling function) within a certain tolerance of an integer or other convenient multiple or factor of the frame rate, and so forth. The fixed frame rate can be determined in a variety of different ways without departing from the spirit or scope of the described techniques.

The mapping module 208 represents functionality of the frame rate conversion module 106 to generate a mapping 214 by mapping the source frames 204 of the VFR video 202 to a sequence of result frames 215. The duration of each result frame is fixed and is based on the determined fixed frame rate 212 (e.g., the duration of each result frame is the inverse of the determined fixed frame rate).

Figure 3:
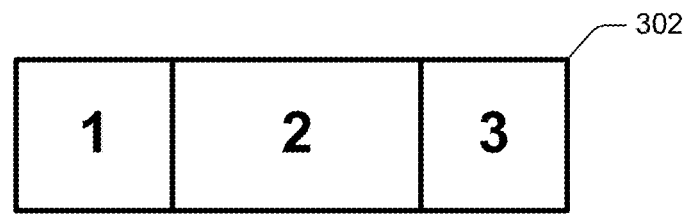
FIG. 3 illustrates an example of mapping VFR video to a sequence of result frames of a fixed frame rate.
Figure 3:
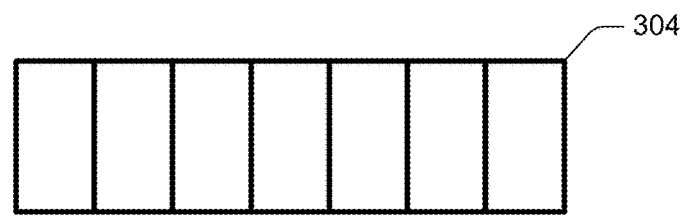
Figure 3:
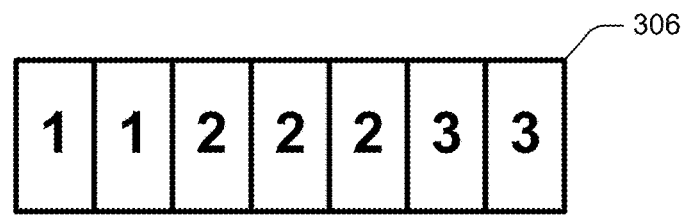

As an example, consider FIG. 3, which illustrates an example 300 of mapping VFR video to a sequence of result frames of a fixed frame rate. In this example, a VFR video 302 includes source frames which are labeled as source frames 1, 2, and 3. Notably, the source frames of VFR video 302 have varying durations (which are represented in the depicted figures by varying widths of the labeled source frames of VFR video 302), which causes the frame rate of the VFR video 302 to be variable. Specifically, source frame 2, in this example, has a longer duration than source frames 1 or 3. The frame rate determination module 206 determines a fixed frame rate 212, using one of the approaches discussed above, and then creates a sequence of uninitialized result frames 304 based on the fixed frame rate 212. For example, the duration of each of the result frames 304 is computed as the inverse of the determined fixed frame rate 212.

Next, the mapping module 208 generates a mapping 306 by mapping the source frames 204 of the VFR video 202 to the sequence of result frames 304. To do so, the mapping module 208 selects one of the source frames to map into each uninitialized or potential result frame 304 using a predefined mapping approach. Generally, the mapping tends to produce repeated or skipped source frames. In example 300, the mapping 306 includes the sequence of source frames 1, 1, 2, 2, 2, 3, 3. Notably, therefore, mapping 306 results in a repetition of frames 1, 2, and 3.

Figure 4:
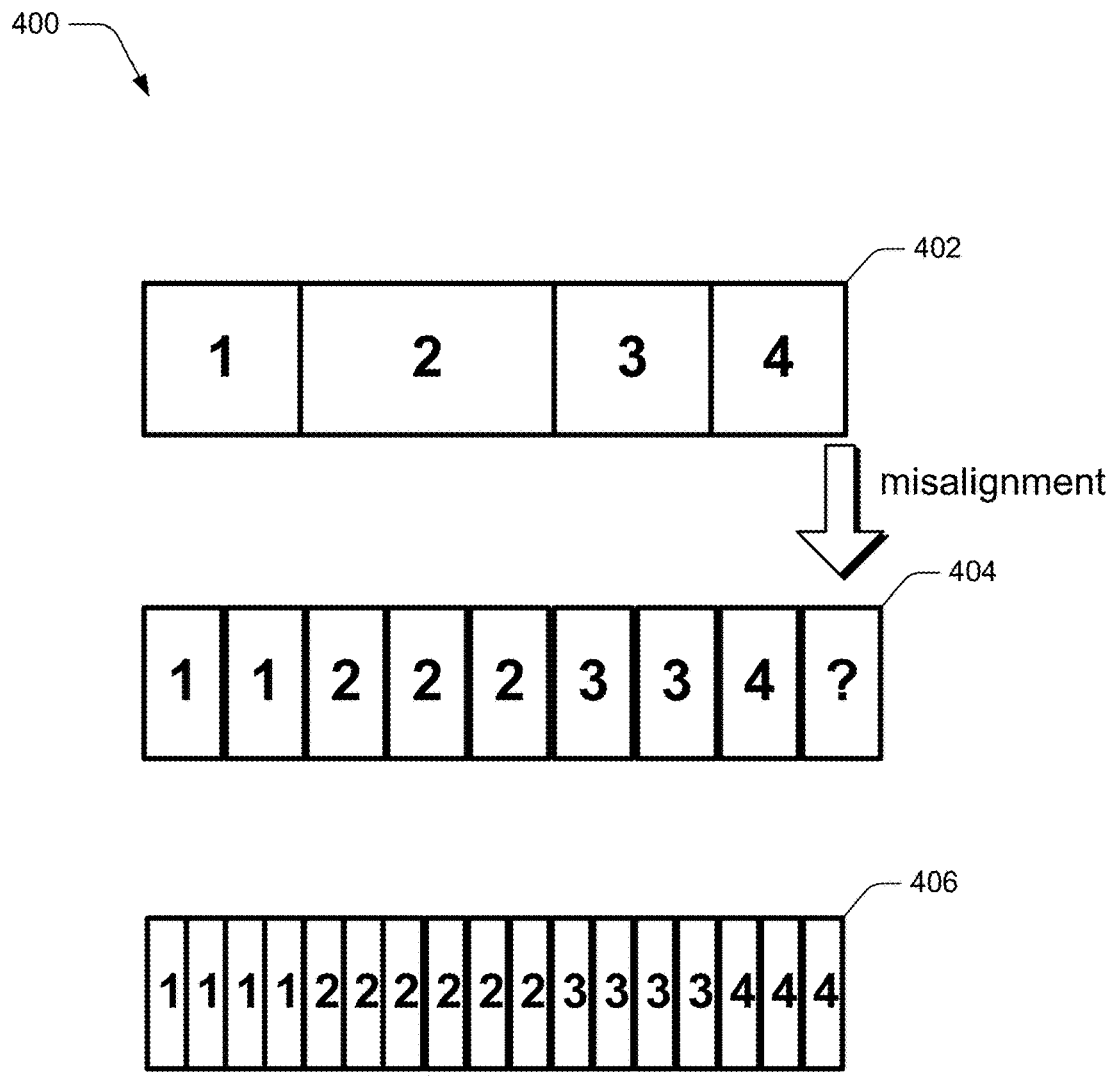
FIG. 4 illustrates an additional example of mapping VFR video to a sequence of result frames of a fixed frame rate.

In many cases, it is possible to encounter a source frame that does not fall at a boundary of the previously chosen fixed frame rate, which, if a maximally accurate result is to be produced, signifies the need to select an even higher fixed frame rate. Consider, for example, FIG. 4 which illustrates an additional example 400 of mapping VFR video to a sequence of result frames of a fixed frame rate. In this example, a VFR video 402 includes source frames 1, 2, 3, and 4. Notably, the source frames of VFR video 402 have varying durations, causing the frame rate of the VFR video 402 to be variable. For example, source frame 2, in this example, has a longer duration than source frames 1, 3, and 4, and source frame 4 has a shorter duration than source frames 1, 2, and 3. The frame rate determination module 206 determines a fixed frame rate 212, using one of the approaches discussed above, and generates a mapping 404 by mapping the source frames of the VFR video 402 to a sequence of result frames with equal durations based on the determined fixed frame rate. The mapping 404 includes the sequence of source frames 1, 1, 2, 2, 2, 3, 3, and 4. However, in this instance, there is a misalignment between the length of the VFR video and the mapping 404.

To remedy this misalignment, the fixed frame rate may be increased to generate a mapping 406. However, as longer sequences of VFR video frames are encountered (each frame of which may have a generally unpredictably longer or shorter duration) an ever-higher fixed frame rate would need to be selected to produce a maximally accurate result mapping. So for a maximally accurate result mapping the suitable frame rate could be in the range of millions of frames per second or higher, which is beyond the refresh rate of any commonly available display device. Similarly, compositing two streams of VFR video and maintaining perfectly accurate timing also requires an arbitrarily high frame rate that is beyond the refresh rate of any typical display device. Thus, whether a fixed frame rate is chosen as a convenience for writing video editing software, as a requirement for limiting CPU usage, as a necessity for matching a particular class of display devices, as an acknowledgement of the limitations of human perception, or for any other reason, that fixed frame rate will in general need to be lower than the theoretical frame rate required to reproduce the original VFR material in a perfectly faithful (i.e. maximally accurate) way.

In many instances, source frames 204 from VFR video 202 cannot simply be mapped one-to-one to a target sequence of result frames of the fixed frame rate 212, even if the target fixed frame rate happens to be the average frame rate of the source frames 204, because in any given localized area timing errors would thus be introduced. If all the variable duration source frames 204 are played, presented, accessed, or otherwise processed at the determined fixed frame rate 212, depending on the particular distribution of unequal frame durations in the source frames 204, not only would the video drift from its appropriate audio synchronization, but video artifacts may be introduced. For example a visual feature with smooth constant motion in the source frames could appear to speed up and/or slow down in an abrupt or jittering manner in the fixed frame rate result. Thus, it is important to reduce these timing errors below an acceptable threshold even for video-only material. Media that includes video with synchronized audio generally needs a very low threshold for timing errors, in the neighborhood of a single video frame duration or less.

The mapping module 208 may utilize a variety of different mapping rules 217 to generate the mapping 214. One such mapping rule 217 selects the source frame 204 which occupies the longest duration relative to the start time and duration of the particular target result frame 215 under consideration. However, in some cases the duration of a source frame relative to a target result frame may not be as important of a consideration for synchronization as its start time. Thus, in another mapping approach, the mapping can be selected based on the start time of the source frame without regard to the duration. For instance, one mapping rule 217 selects the source frame 204 with a start time that is closest to the respective start time of the target result frame 215. Generally, this mapping approach may result in smoother motion with perhaps fewer skipped or repeated source frames than a mapping approach which selects the source frame based on duration relative to the target result frame.

Another such mapping rule 217 selects the closest source frame 204 from the past (in terms of difference between start times) unless the closest source frame from the future is nearer and has a timing error that is less than a chosen error tolerance (e.g., one half of one fixed frame duration). In other words, a first source frame with the closest start time beginning prior to the target result frame start time and a second source frame with the closest start time beginning after the target result frame start time are identified. The second source frame is then selected only if the absolute value of the difference between start times of the second source frame and the target result frame is less than the absolute value of the difference between start times of the first source frame and the target result frame and that smaller value (representing the timing error) is less than the error tolerance. Otherwise, the first source frame is selected. However, the mapping 214 may be generated according to a variety of different mapping rules, including those mentioned above or a combination of the rules mentioned above, without departing from the techniques described herein.

Figure 5:
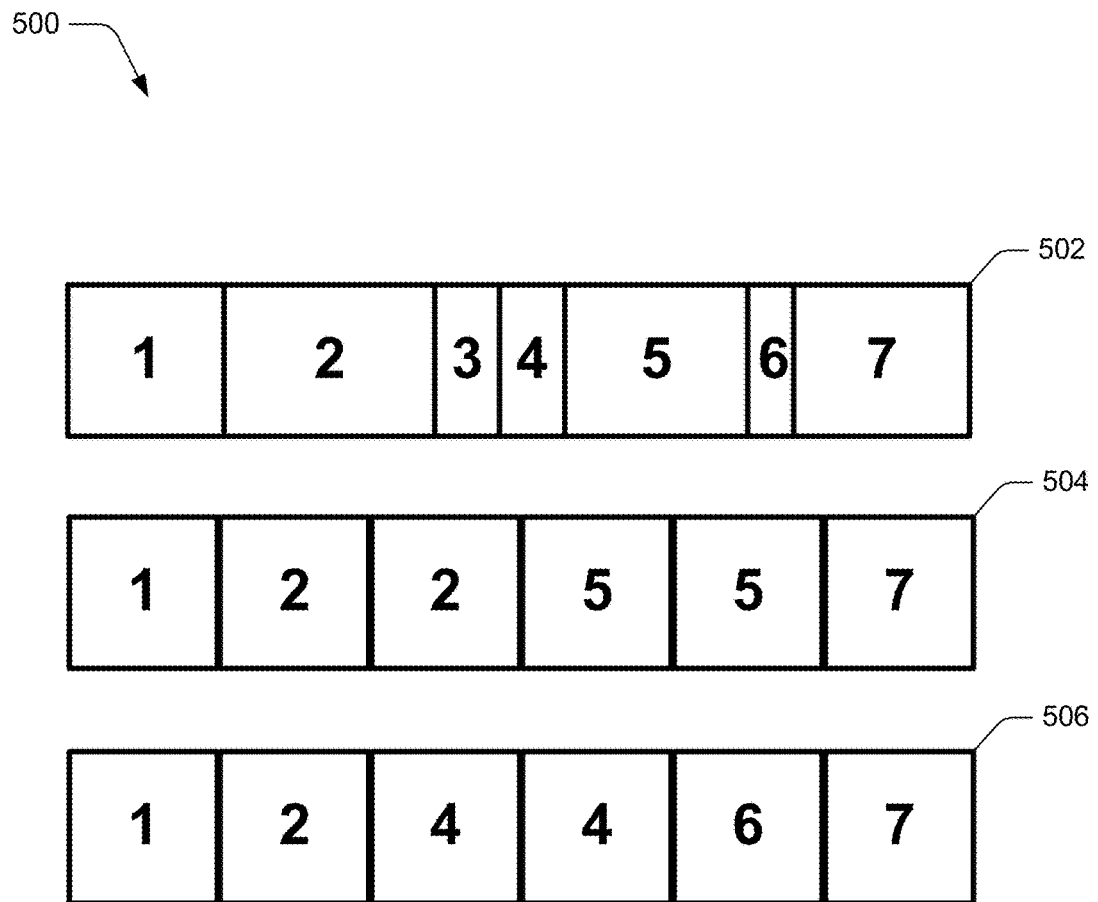
FIG. 5 illustrates an example of mapping source frames of a VFR video to a sequence of target result frames utilizing different mapping rules.

Notably, the mapping rule 217 utilized by the mapping module 208 may be configured to generate a variety of different mappings 214. Consider, for example, FIG. 5 which illustrates an example 500 of mapping source frames of a VFR video to a sequence of target result frames utilizing different mapping rules. In example 500, a VFR video 502 includes source frames 1, 2, 3, 4, 5, 6, and 7. The frame rate determination module 206 determines a fixed frame rate 212, using one of the approaches discussed above, and generates or contemplates result frames of a fixed duration based on the fixed frame rate. The mapping module 208 may be configured to generate a first mapping 504 using a duration-based mapping rule 217 by mapping the source frames of the VFR video 502 to the result frames based on which source frame occupies the longest duration relative to the duration of the target result frame of the first mapping 504. This mapping results in the sequence of source frames 1, 2, 2, 5, 5, and 7. Thus, generating the first mapping using the duration-based approach results in repeating frames 2 and 5, and skipping frames 3, 4, and 6. Alternately, the mapping module 208 may be configured to generate a second mapping 506 using a start-time based mapping rule 217 by mapping the source frames of the VFR video 502 to the result frames based on minimizing the absolute value of the difference between each target result frame start time and the start time of the source frame chosen to map to that target. This mapping approach may result in smoother motion with one repeated source frame (frame 4), and two skipped source frames (frames 3 and 5).

Figure 6:
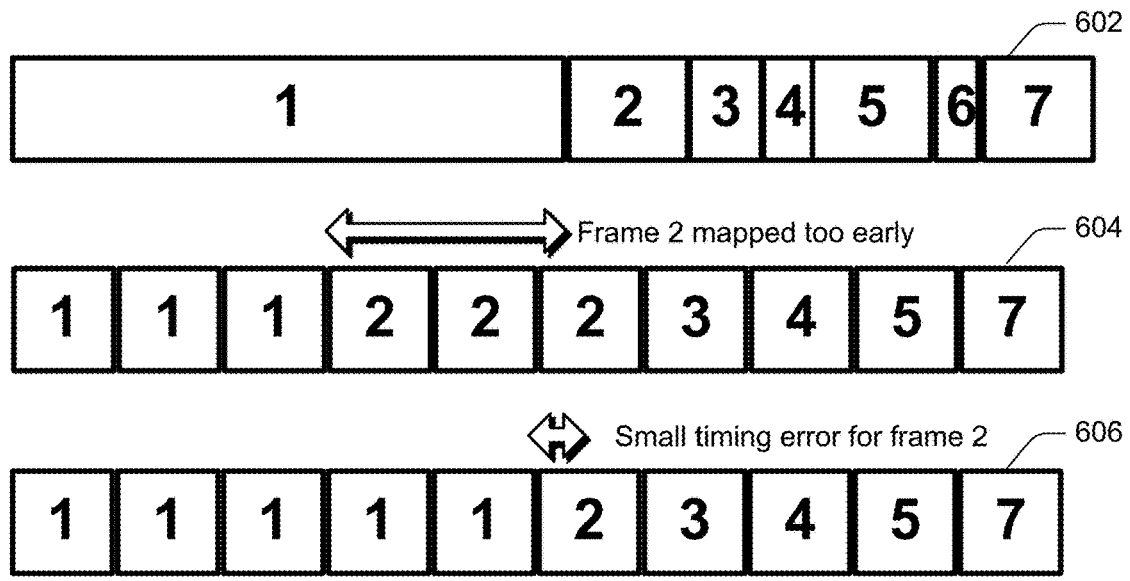
FIG. 6 illustrates an additional example of mapping source frames of a VFR video to a sequence of target result frames utilizing different mapping rules.

FIG. 6 illustrates an additional example 600 of mapping source frames of a VFR video to a sequence of target result frames utilizing different mapping rules. In example 600, a VFR video 602 includes source frames 1, 2, 3, 4, 5, 6, and 7. In this sequence, frame 1 has a much longer duration than the other source frames. This may be the result of an intentionally still frame requiring no visual motion. Source frame 2 follows source frame 1, and may be associated with audio material that is synchronized with the visual content of source frame 2.

The mapping module 208 may be configured to generate a first mapping 604 using the start-time based mapping rule 217. As the mapping is based on a comparison of start times between the source frame and each result frame (selecting the frame with the nearest start time), this mapping results in the mapping module 208 mapping source frame 2 "too early," before the associated moment in the synchronized audio, which causes audio associated with source frame 2 to be out of sync. The mapping module 208 may be configured to generate a second, "more appropriate" mapping 606 using the mapping rule which selects the closest source frame 204 from the past (in terms of difference between start times) unless the closest source frame from the future is nearer and has a timing error that is less than a chosen error tolerance (e.g., one half of one fixed frame duration).

No matter which mapping rules 217 are utilized by the mapping module 208 to generate the mapping 214, certain source frames from the VFR video will tend to be skipped (unless the fixed frame rate is high enough) and certain frames tend to be chosen for repetition (unless the fixed frame rate is low enough). In general, when the source frames in a localized area have an average frame rate higher than the chosen fixed frame rate, some of these frames must be skipped to reduce timing error (e.g., to preserve acceptable audio synchronization), and if a localized area has frames with an average frame rate lower than the chosen fixed frame rate, some frames must be repeated to reduce timing error.

Thus, after the initial mapping 214 is produced, in order to improve the smoothness of motion of the mapping, the adjustment module adjusts the initial mapping 214. Generally, the adjustment module 210 represents functionality of the frame rate conversion module 106 to analyze the mapping 214 generated by mapping module 208, and to adjust the mapping 214 to generate an adjusted mapping 216 which improves the smoothness of motion of the video within acceptable limits of timing error. The adjusted mapping 216 is then used by the conversion module 211 to convert the VFR video 202 into a fixed frame rate video 218 having the fixed frame rate 212 based on the adjusted mapping 216. Generally, video 218 may be a literal video media object residing in memory or storage, and/or a virtual or conceptual video object involving mapping information, instructions, parameters, or other data related to how VFR video may be accessed, interpreted, and/or processed in such a way that it may be supplied, played, presented, manipulated, and/or otherwise used as fixed frame rate video. In one approach, the adjustment module 210 generates the adjusted mapping 216 by adding a skipped source frame, removing a repeated source frame, and shifting sequential result frames 215 of the mapping 214 between a skip location of the skipped source frame in the mapping 214 and a repeat location of the repeated source frame in the mapping 214.

Figure 7:
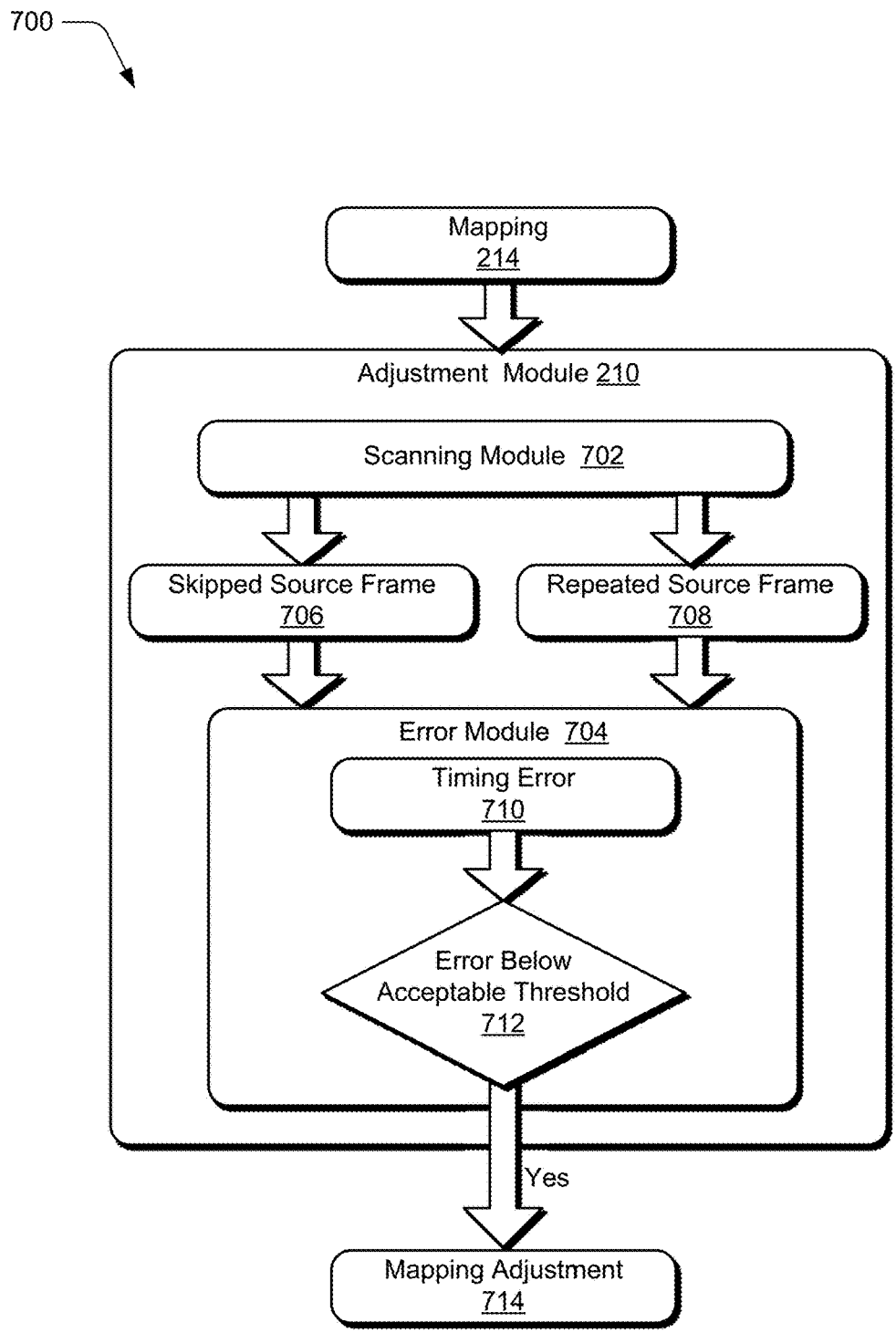
FIG. 7 illustrates a system showing the adjustment module of FIG. 2 in more detail.

FIG. 7 illustrates a system 700 showing the adjustment module of FIG. 2 in more detail. In system 700, adjustment module 210 is illustrated as including a scanning module 702 and an error module 704. The adjustment module 210 obtains the mapping 214 from the mapping module 208, and the scanning module 702 scans the mapping 214 to locate a skipped source frame 706 at a skip location in the mapping 214.

When a skipped source frame 706 is found, the scanning module 702 scans the mapping 214 to find a repeated source frame 708. If a repeated source frame 708 is found, the error module 704 computes a timing error 710 which would occur if the skipped source frame 706 were added at the skip location, the repeated source frame 708 were removed, and sequential result frames 215 were shifted between the skip location of the skipped source frame in the mapping 214 and a repeat location of the repeated source frame 708 in the mapping 214.

In one or more implementations, the scanning module scans in a first direction from the skip location to find a repeated source frame. If the repeated source frame is not found by scanning in the first direction, then the scanning module scans in a second direction from the skip location to find the repeated source frame. For example, the scanning module may first scan to the left to locate the repeated source frame, and then scan to the right, or vice versa.

The timing error 710 may be determined by the error module 704 in a variety of different ways. In one approach, the timing error is determined based on an offset between start times. In this approach, for a result frame which is the first frame that maps from a particular associated source frame, the timing error is computed as the distance between the start of the source frame and the start of the result frame, expressed as a positive number. For any other result frame that maps from that same associated source frame the error is defined to be zero. In another approach, the timing error 710 is determined based on both the start and end offsets. In this approach, for a result frame that completely overlaps the duration of the associated source frame, the timing error is defined to be 0. For a result frame which is the first frame that maps from a particular associated source frame, the timing error 710 is determined as the distance between the start of the source frame and the start of the result frame, expressed as a positive number. For a result frame which is the last frame that maps from that same particular associated source frame, the timing error 710 is determined as the distance between the end of the source frame and the end of the result frame, expressed as a positive number; and if a frame falls into both the latter two categories, the error is the sum, or some other mathematical combination, of the start and end errors. Additionally, since each contemplated mapping adjustment can involve more than one frame, the error module may aggregate the timing error computations from all frames involved in the adjustment. This aggregation can be done in numerous ways, such as using only the timing error from a single frame result (e.g., the first, last, or mid-point frame involved in the contemplated adjustment), or by computing a maximum, minimum, mean, or weighted average of timing errors from all frames involved in the contemplated adjustment. However, the timing error 710 may be calculated in a variety of different ways without departing from the spirit or scope of the described techniques.

At 712, the error module 704 compares the computed timing error 710 to an acceptable threshold, and if the timing error 710 is below the acceptable threshold, then the adjustment module performs a mapping adjustment 714 by adding the skipped source frame 706 at the skip location of the mapping 214, removing the repeated source frame 708 from the mapping, and shifting the sequential result frames 215 between the skip location of the skipped source frame in the mapping 214 and a repeat location of the repeated source frame 708 in the mapping 214. Notably, the timing error 710 will generally be expressed as a signed value, or as a leading versus lagging error value so that the threshold determination 712 can determine the acceptability of leading versus lagging timing errors differently. A leading timing error tolerance may be configured differently from a lagging timing error tolerance because, for example, human perception of acceptable audio synchronization generally results in different tolerances for leading versus lagging timing error.

Figure 8:
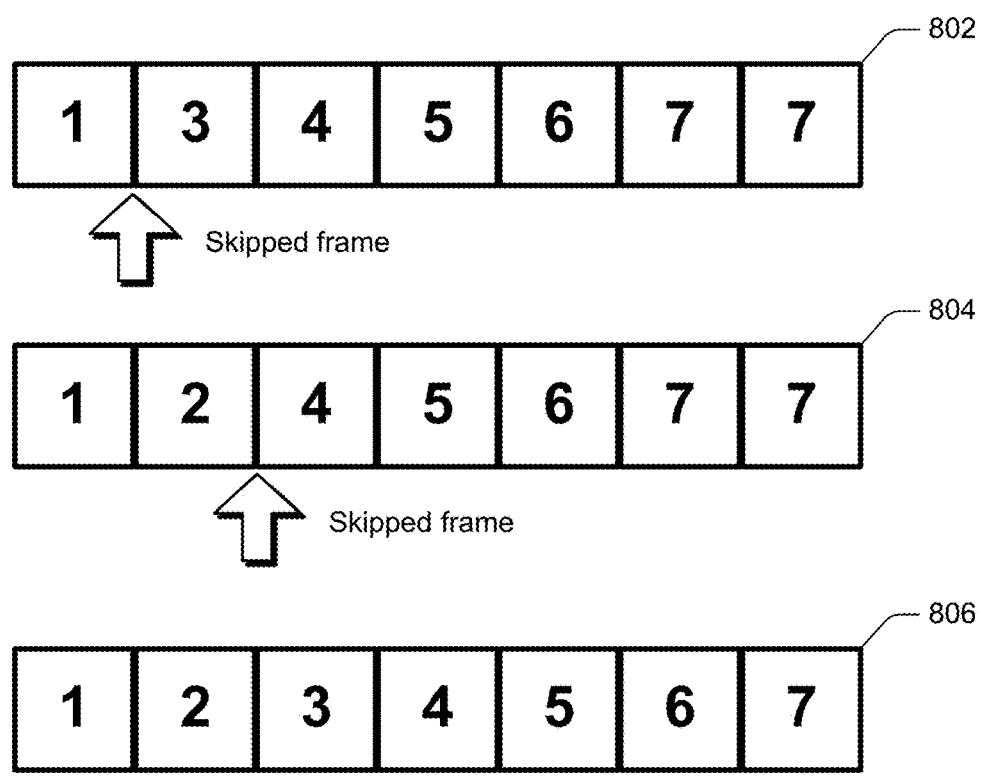
FIG. 8 illustrates an example of adjusting a mapping in accordance with one or more implementations.

Consider, for example, FIG. 8 which illustrates an example 800 of adjusting a mapping in accordance with one or more implementations. In this example, an initial mapping 802 of VFR video (not pictured) includes a repeated source frame 7 and skips source frame 2. An adjustment process that simply introduces source frame 2 into the result frames without considering the characteristics of the surrounding mapping will be unhelpful in this instance. For example, in FIG. 8, an adjusted mapping 804 simply moves the skipped source frame 2 and possible associated motion artifact to a different location. Notably, if the visual content of frame 3 and frame 4 is identical, while frames 1, 2, and 4 are unique, the adjustment could be an improvement, but the described techniques do not analyze the visual content in question, and are therefore free from the computational cost of doing so.

However, because there is a repeated source frame later in the sequence (frame 7), an adjustment which not only introduces the skipped source frame, but also shifts the adjacent sequential frames until a repeated source frame is encountered is potentially helpful. The increased timing error of this potential adjustment has to be evaluated. If the timing offset among the adjusted frames is within acceptable limits, the adjustment can be applied, resulting in smoother video motion. In this scenario, the adjustment module 210 detects the skipped source frame 2, and then scans from the skip location to locate repeated source frame 7. Then, the adjustment module determines the aggregated the timing error if skipped source frame 3 were added to the mapping, the frames were shifted to the right, and repeated source frame 7 removed. If the error is below an acceptable threshold, then the adjustment module 210 generates the adjusted mapping 806 which adds skipped source frame 2, shifts the frames to the right, and removes repeated source frame 7.

Figure 9:
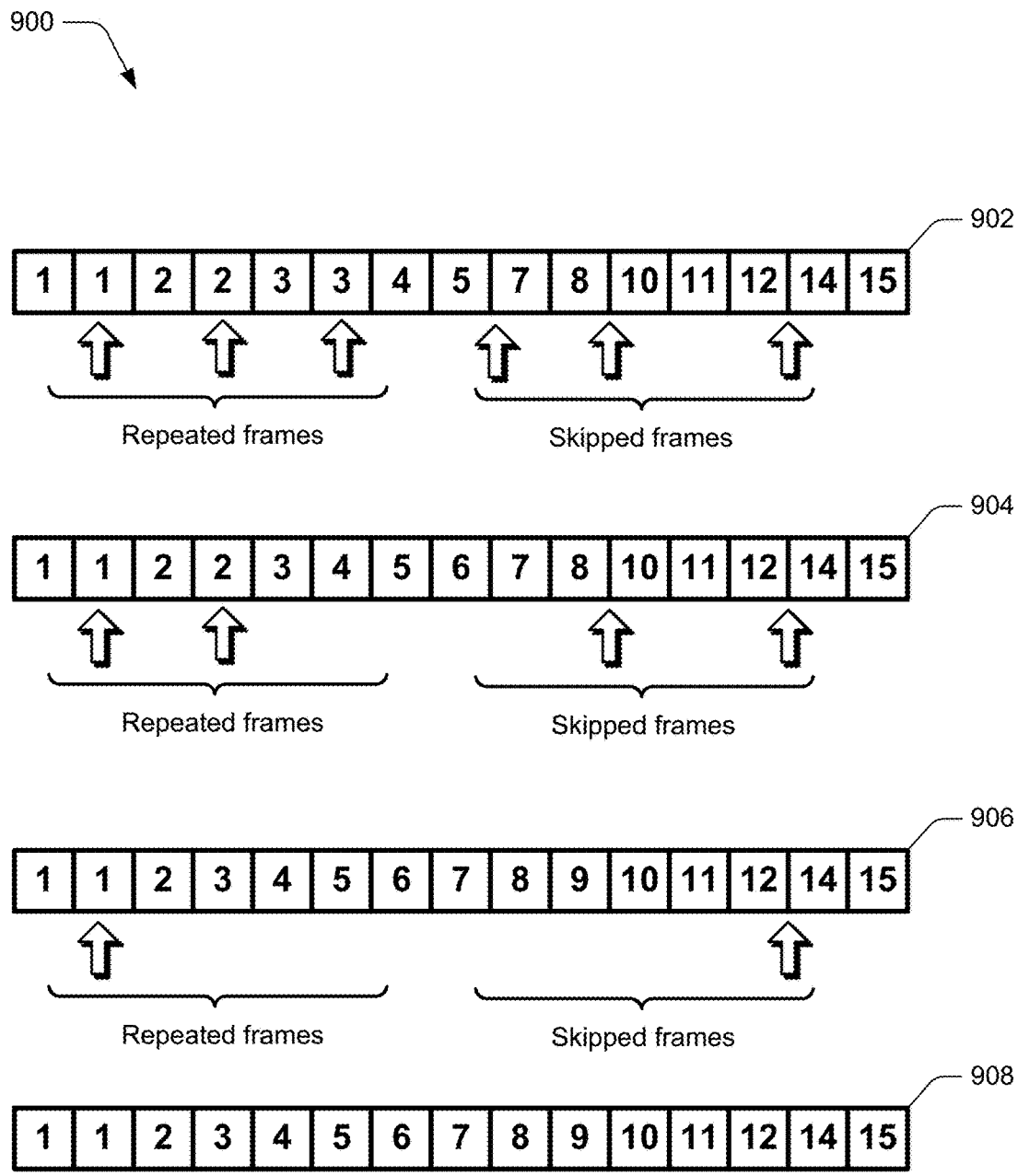
FIG. 9 illustrates an example of adjusting a mapping in multiple iterations.

Adjustment module 210 repeats this process throughout the entire mapping 214 until no further potential adjustments are determined to be acceptable by error module 704. Thus, through zero or more acceptable mapping adjustments 714, the final adjusted mapping 216 is produced. Note that, especially at higher fixed frame rates, at which the timing error tolerance will tend to be greater than a single frame duration, the procedure followed by adjustment module 210 as described above may result in the multiple adjustments being applied to the same set of frames. This emphasizes that scanning module 702 may be configured not simply to scan for skipped and repeated frames in a single direction from one end of the mapping to the other, but to continue seeking potential adjustments throughout the mapping until no potential adjustment is acceptable. As an example, consider FIG. 9 which illustrates an example 900 of multiple mapping adjustment iterations affecting the same localized region of frames. In this example, an initial mapping 902 of a VFR video (not pictured) includes repeated source frames (1, 2, and 3), and skipped source frames (6, 9, and 13). In a first pass, a first adjusted mapping 904 is generated by adding skipped source frame 6, shifting the frames to the left, and removing repeated source frame 3. Then, in a second pass, a second adjusted mapping 906 is generated by adding skipped source frame 9, shifting the frames to the left, and removing repeated source frame 2. Then, in a third pass, a third adjusted mapping 908 is generated by adding skipped source frame 13, shifting the frames to the left, and removing repeated source frame 1.

Figure 10:
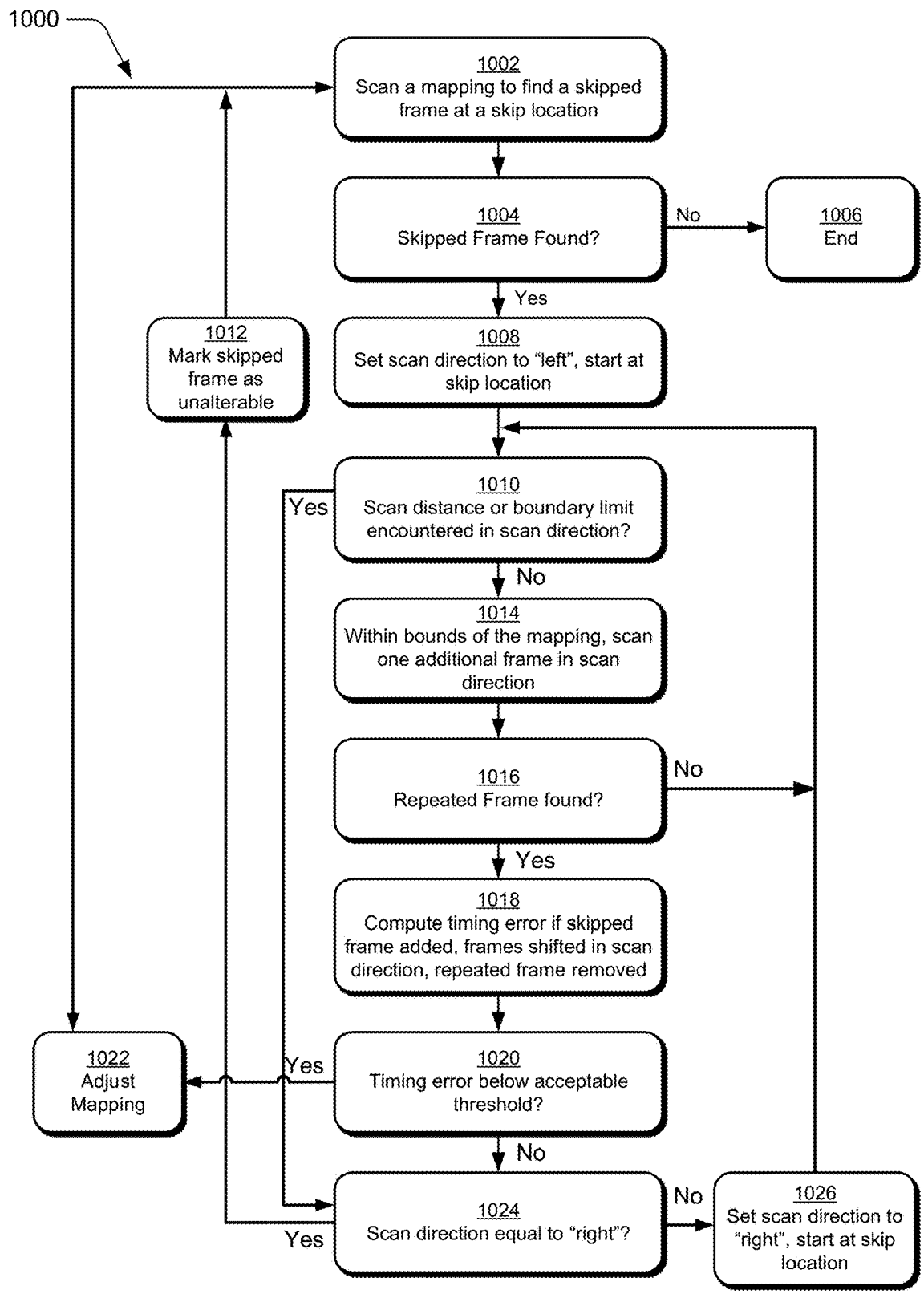
FIG. 10 illustrates an example procedure for generating an adjusted mapping in accordance with one or more implementations.

FIG. 10 illustrates an example procedure 1000 for generating an adjusted mapping in accordance with one or more implementations. At 1002, a mapping is scanned to find a skipped source frame at a skip location. For example, the scanning module 702 may scan the mapping 214 to find a skipped source frame 706 at a skip location. The skipped source frame 706 may correspond to a frame that the adjustment module 210 has not previously identified as unalterable. At 1004, if a candidate skipped source frame is not found in the mapping, then the adjustment process ends at 1006.

Alternately, if a candidate skipped source frame is found, then at 1008 a scan direction is set to a first scan direction, and the mapping 214 is scanned from the skip location of the skipped source frame 706 in the scan direction. The scan direction corresponds to the direction that the scan module will scan the mapping to find a repeated source frame after the skipped source frame is found. In this example, the scan direction is initially set to left, but alternately the scan direction may initially be set to right.

At 1010, if a scan distance or a boundary limit is encountered in the scan direction, then at 1024 the scan direction is changed to trigger scanning in the alternate direction. Note that a boundary limit may occur at the start and end of the mapping 214, but can also be configured to occur at other points in the mapping. A distance limit may be configured to be infinite (a nonexistent limit) or configured to a finite value as a throttle to limit the time, power, memory, or other resources used by the scanning module 702. If the scan has already been completed in both directions, the skipped source frame is marked as "unalterable" at 1012 by the adjustment module 210. The adjustment module 210 then begins the process again to find a skipped source frame that is an alterable candidate. Alternately, if the scan distance or boundary limit is not encountered, then at 1014, one additional frame is scanned in the scan direction. At 1016, if a repeated source frame is not found, then the process continues. However, if a repeated source frame is found, then at 1018 the error module computes a timing error which would occur if the skipped source frame 706 were inserted at the skip location, the repeated source frame 708 were removed, and sequential result frames 215 were shifted between the skip location of the skipped source frame 706 in the mapping 214 and a repeat location of the repeated source frame 708 in the mapping 214. Note that if multiple frames are skipped at the same skip location, the skip frame 706 proposed for insertion can be any of the skipped source frames as selected by any suitable computation, such as adding the frame number to the left of the skip point and the frame number to the right of the skip point, then dividing by two, then using a ceiling or floor operator.

At 1020, the error module 704 compares the computed timing error 710 to an acceptable threshold, and if the timing error 710 is below the acceptable threshold, then at 1022 the mapping 214 is adjusted by adding the skipped source frame 706 at the skip location of the mapping 214, removing the repeated source frame 708 from the mapping, and shifting the sequential result frames 215 between the skip location of the skipped source frame in the mapping 214 and a repeat location of the repeated source frame 708 in the mapping 214.

Alternately, if at 1020 it is determined that the timing error is not below the acceptable threshold, then at 1024 it is determined whether the scan direction is set to "right". If the scan direction is set to right, then the search is known to have been unsuccessful in both directions, and the skipped source frame is marked as unalterable at 1012. If the scan direction is not set to right, then at 1024, the scan direction is set to right, the scan start point reset back to the initial location determined at 1004, and the mapping is scanned in the new direction at 1010.

Notably, the adjustment procedure 1000 is just one example of an adjustment process that can be utilized by the adjustment module 210 to adjust a mapping 214. However, other procedures or algorithms may be utilized by the adjustment module 210 without departing from the spirit or scope of the described techniques. For example, the scan could proceed in the left and right directions in a single step rather than in completely separate passes. As another example, the first scan could seek for the location of either a skipped or a repeated frame, and the second scan could seek for the location of a repeated frame if the first scan found a skipped frame or the location of a skipped frame if the first scan found a repeated frame. As discussed above, the timing error computation and threshold test could be a computation of maximum error over the shifted range or a comparison against a specific fixed value, or a more complex averaging algorithm, conceivably even based on rudimentary analysis of the source video and/or audio content.

Notably, the adjustment procedure 1000 may create an actual mapping in memory, analyzed and modified in its entirety, relating each result frame to its corresponding source frame, and stored in its entirety for use by the video system 112. However, in many cases, the source VFR video may be composed of hundreds of thousands of frames, and thus it may be difficult to analyze the entire mapping at one time or to store it in its entirety while utilizing low processing resources. Thus, in some cases, the mapping can be approximated, and computations can be performed closer to the presentation, manipulation, or access time of the video within a localized neighborhood of source frames without the need to store the resulting mapping.

Notably, if the adjustment procedure 1000 is applied in isolation for a given frame, then the frame selection choices made from the beginning of the procedure may affect choices made all the way to the end of the procedure. Consider, for example, FIG. 11 which illustrates an example 1100 of adjustments made to a mapping. In this example, an initial mapping 1102 includes multiple repeated and skipped source frames, and a desired adjusted mapping 1104 indicates a desired adjustment to remove the skipped and repeated source frames. However, if the adjustment procedure is applied for the second output frame (frame B) in isolation, the adjustment module 210 will see a repeated source frame to the left and a skipped source frame to the right, and thus will map source frame 2 to result frame B in an attempt to restore the result frame sequence "1 1 3" to "1 2 3". If the same adjustment procedure is applied for the third output frame (frame C) in isolation, the adjustment module 210 will also see a skipped source frame (in this case to the left) and a repeated source frame (in this case to the right), and thus will map source frame 2 to result frame C, similarly attempting to restore the sequence "1 3 3" to "1 2 3". Thus, the isolated mapping approach generates mapping 1106 (1224467) which includes results that, although different from the original mapping, can have similar motion artifacts, and is in general, equally undesirable relative to mapping 1104.

Thus, to solve this problem, in one or more implementations the adjustment module 210 approximates the complete mapping by dividing the fixed rate mapping into segments bounded on the left by a skipped source frame, and segments bounded on the left by a repeated source frame, and treats these segments differently. For one type of segment, the adjustment module completes the modification naturally, while for the other type of segment the adjustment module completes the modification only if the previous segment would not be modified.

Figure 12:
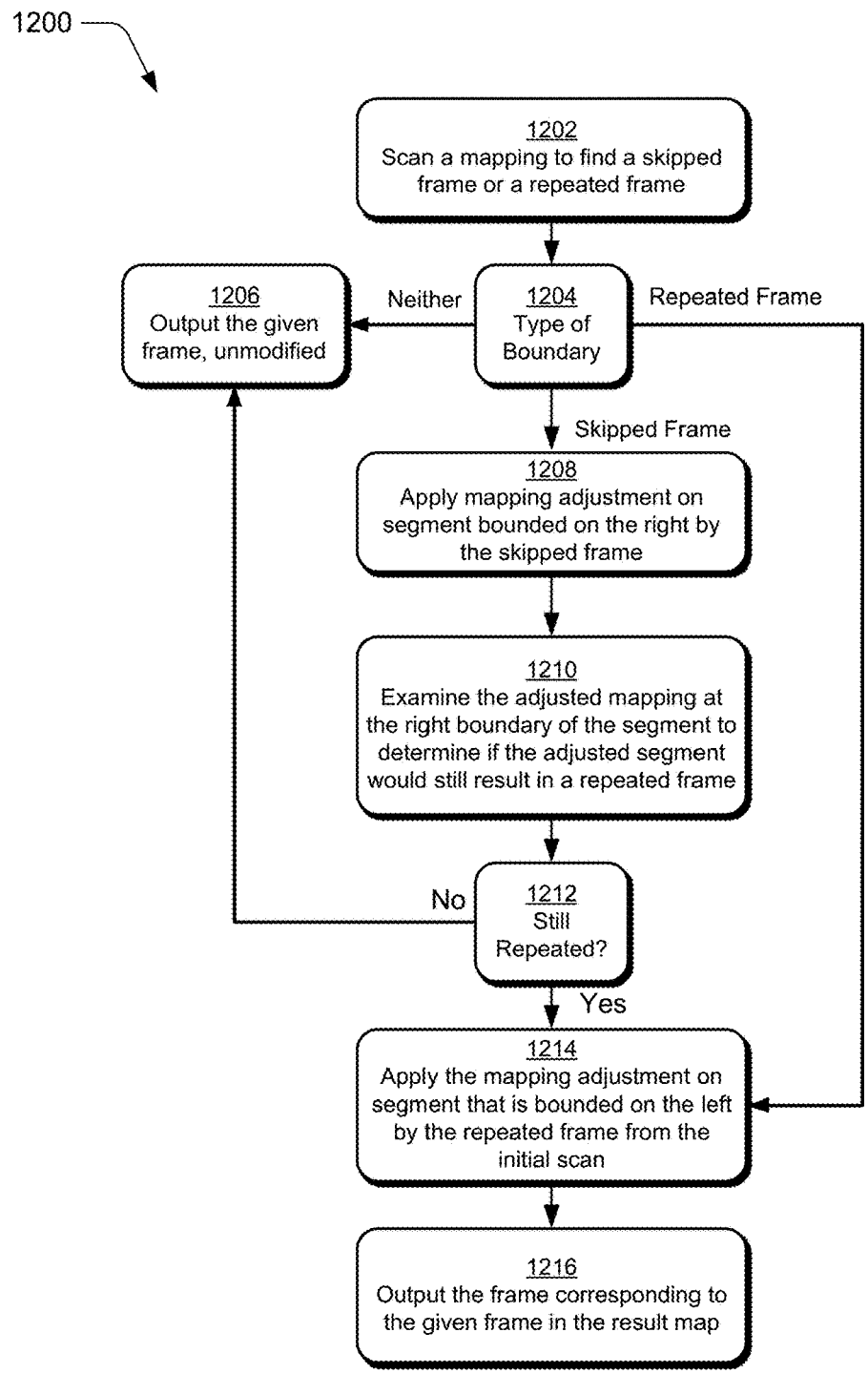
FIG. 12 illustrates an example procedure for generating an adjusted mapping in accordance with one or more implementations.

Consider, for example, FIG. 12 which illustrates an example procedure for generating an adjusted mapping in accordance with one or more implementations.

At 1202, the scanning module 702 scans the mapping 214 to find a skipped source frame or a repeated source frame. At 1204, if neither a repeated source frame nor a skipped source frame is found, then at 1206 the given result frame of the original mapping 214 is output.

Alternately, if a skipped source frame is found at 1204, then at 1208 a mapping adjustment (e.g., adjustment procedure 1000) is applied on a segment of result frames bounded on the right by the skipped source frame. At 1210, the adjusted mapping is examined at the right boundary to determine if the adjusted segment would still result in a repeated source frame. At 1212, if it is determined that the adjusted segment will not result in a repeated source frame, that is, that the segment bounded on the right by the skipped frame would be adjusted by the adjustment procedure, then at 1206 the given result frame of the original mapping 214 is output. In other words, the current segment should not be modified, because the segment previous to the current segment would be modified by the adjustment procedure.

Alternately, if it is determined that the adjusted segment would still result in the repeated source frame, then at 1214 the mapping adjustment (e.g., adjustment procedure 1000) is applied on the segment of result frames that is bounded on the left by the repeated source frame from the initial scan. Similarly, this step is performed if a repeated source frame is found at step 1204. Then, at 1216, the frame corresponding to the given frame in the result map, that is, the result frame as modified by the mapping adjustment, is output. Notably, this real-time approximation procedure may result in smoother VFR motion without the need to process timing information outside a small, localized area, or to store a large recomputed map in memory.

This adjustment process can be implemented with a "favor R" approximation in which segments bounded on the left by a repeated source frame are modified in the usual way, while segments bounded on the left by a skipped source frame are only modified if the previous segment is unmodified, that is, the approximation method shown in FIG. 12. Alternately, in a "favor S" approximation, segments bounded on the left by a skipped source frame are modified in the usual way, while segments bounded on the left by a repeated source frame are only modified if the previous segment is unmodified, that is, an approximation method similar to the one shown in FIG. 12, but with every occurrence of the words "repeated" and "skipped" swapped.

Having discussed example details of the techniques for converting variable frame rate video to fixed frame rate video, consider now some example procedures to illustrate additional aspects of the techniques.

Example Procedures

This section describes example procedures for converting variable frame rate video to fixed frame rate video in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102 of FIG. 1 that makes use of a frame rate conversion module 106 or the example system 200 of FIG. 2, which also makes use of this module. A suitable device for performing the procedures may also be a service provider accessible to the computing device 102 over the network 114 and having a frame rate conversion module 106.

Figure 13:
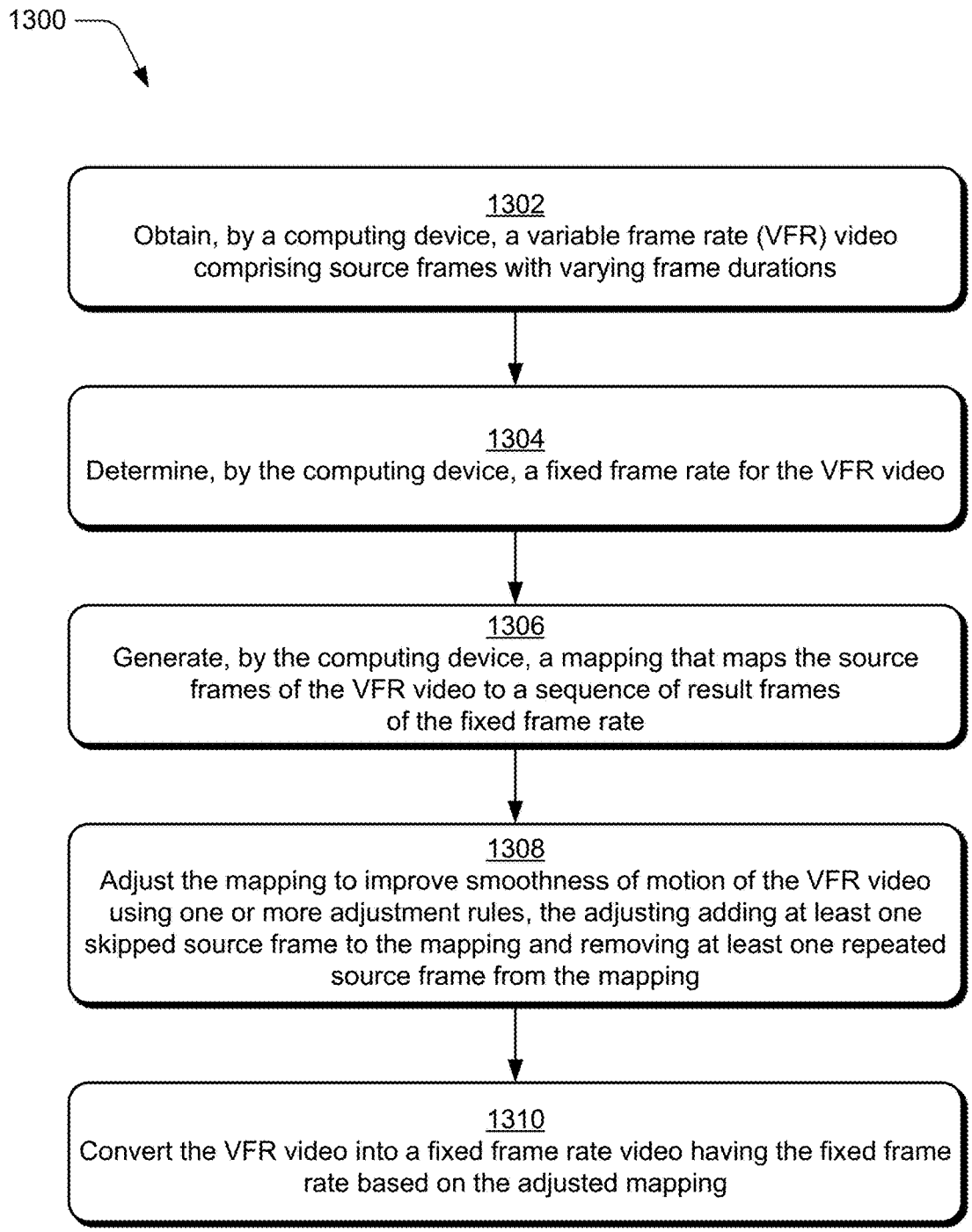
FIG. 13 depicts an example procedure in which variable frame rate video is converted into fixed frame rate video.

FIG. 13 depicts an example procedure 1300 in which variable frame rate video is converted into fixed frame rate video. A variable frame rate (VFR) video which includes source frames with varying frame durations is obtained by a computing device (block 1302). For example, the frame rate conversion module 106 obtains VFR video 202 with a variable frame rate. Broadly speaking, VFR video 202 includes a sequence of source frames 204 with a variable frame rate. In other words, rather than each source frame having a fixed duration, the source frames 204 have varying frame durations which causes the frame rate of the VFR video 202 to be variable.

A fixed frame rate for the VFR video is determined by the computing device (block 1304). By way of example, the frame rate determination module 206 determines a fixed frame rate 212 for the VFR video 202. A variety of different approaches may be utilized by the frame rate determination module 206 to determine the fixed frame rate 212. In some cases, the fixed frame rate is determined based on the VFR video, such as by determining the fixed frame rate based on an average frame duration of the VFR video, a shortest frame duration of the VFR video, a longest frame duration of the VFR video, a maximum, minimum (or other suitable value based on statistical analysis) of an N-sample moving average frame rate within the VFR video (where N is a fixed number of frames, a fixed percentage of the total frame count of the video media, or a value chosen using visual or other attributes of the VFR video). In some cases, the fixed frame rate itself can be chosen based on visual or other attributes of the VFR video. Alternately, a standard fixed frame rate may be selected for the VFR video, such as 24 fps, 60 fps, and so forth. In these instances, the determined fixed frame rate 212 may not be based on the VFR video 202 itself. In other words, the determined fixed frame rate 212 may be based on system preferences or requirement, and not based on the source frames 204 of the input VFR video 202. Alternately, the fixed frame rate could be chosen by determining an available fixed rate close to, greater than, or less than an ideal rate computed as described above based on the source frames 204 of the input VFR video 202, or a suitable multiple or factor of such a computed ideal rate. Notably, the fixed frame rate can be determined in a variety of different ways without departing from the spirit or scope of the described techniques.

A mapping that maps source frames of the VFR video to a sequence of result frames of the fixed frame rate is generated by the computing device (block 1306). By way of example, the mapping module 208 generates a mapping 214 by mapping the source frames 204 of the VFR video 202 to a sequence of result frames 215. The duration of each result frame is fixed and is based on the determined fixed frame rate 212 (e.g., the duration of each result frame is the inverse of the determined fixed frame rate).

The mapping module 208 may utilize a variety of different mapping rules 217 to generate the mapping 214. One such mapping rule 217 selects the corresponding source frame 204 which occupies a longest duration relative to the duration of the target result frame 215. However, in some cases the duration of a source frame relative to a target result frame may not be as important of a consideration for synchronization as its start time. Thus, in another mapping approach, the mapping can be generated based on the start time of the source frame without regard to the duration. For instance, one mapping rule 217 selects the source frame 204 with a start time that is closest to the respective start time of the target result frame 215. Generally, this mapping approach may result in smoother motion with fewer skipped or repeated source frames than a mapping approach which selects the source frame based on duration relative to the target result frame.

Another such mapping rule 217 selects the closest source frame 204 from the past (in terms of difference between start times) unless the closest source frame from the future is nearer and has a timing error that is less than a chosen error tolerance (e.g., one half of one fixed frame duration). In other words, a first source frame with a closest start time beginning prior to the target result frame start time and a second source frame with a closest start time beginning after the target result frame start time are identified. The second source frame is then selected only if the absolute value of the difference between start times of the second source frame and the target result frame is less than the absolute value of the difference between start times of the first source frame and the target result frames and that lesser value (i.e. the timing error) is also less than the error tolerance. Otherwise, the first source frame is selected.

However, the mapping 214 may be generated according to a variety of different mapping rules, including those mentioned above or a combination of the rules mentioned above, without departing from the techniques described herein.

The mapping is adjusted, if possible, to improve smoothness of motion of the VFR video by adding at least one skipped source frame to the mapping and removing at least one repeated source frame from the mapping (block 1308).

By way of example, the adjustment module 210 analyzes the mapping 214 generated by mapping module 208 and adjusts the mapping 214 to generate an adjusted mapping 216 which improves the smoothness of motion of the video within acceptable limits for timing error. In one approach, the adjustment module 210 generates the adjusted mapping 216 by adding a skipped source frame, removing a repeated source frame, and shifting sequential result frames 215 of the mapping 214 between a skip location of the skipped source frame in the mapping 214 and a repeat location of the repeated source frame in the mapping 214.

To do so, the adjustment module 210 obtains the mapping 214 from the mapping module 208, and the scanning module 702 scans the mapping 214 to locate a skipped source frame 706 at a skip location in the mapping 214. When a skipped source frame 706 is found, the scanning module 702 scans the mapping 214 to find a repeated source frame 708. If a repeated source frame 708 is found, the error module 704 computes a timing error 710 which would occur if the skipped source frame 706 were added at the skip location, the repeated source frame 708 were removed, and sequential result frames 215 were shifted between the skip location of the skipped source frame in the mapping 214 and a repeat location of the repeated source frame 708 in the mapping 214.

In one or more implementations, the scanning module scans in a first direction from the skip location to find a repeated source frame. If the repeated source frame is not found by scanning in the first direction, then the scanning module scans in a second direction from the skip location to find the repeated source frame. For example, the scanning module may first scan left to locate the repeated source frame, and then scan to the right, or vice versa.

The error module 704 compares the computed timing error 710 to an acceptable threshold, and if the timing error 710 is below the acceptable threshold, then the mapping 214 is adjusted by adding the skipped source frame 706 at the skip location of the mapping 214, removing the repeated source frame 708 from the mapping, and shifting the sequential result frames 215 between the skip location of the skipped source frame in the mapping 214 and a repeat location of the repeated source frame 708 in the mapping 214.

The VFR video is converted into, or presented or interpreted as, a fixed frame rate video having the fixed frame rate (determined as described above) and based on the adjusted mapping (block 1310). For example, the adjusted mapping 216 is used by the conversion module 211 to convert the VFR video 202 into a fixed frame rate video 218, or interpret the VFR video 202 as a fixed frame rate video 218, having the fixed frame rate 212, and based on the adjusted mapping 216.

Having described example procedures in accordance with one or more implementations, consider now an example system and device that can be utilized to implement the various techniques described herein.

Example System and Device

Figure 14:
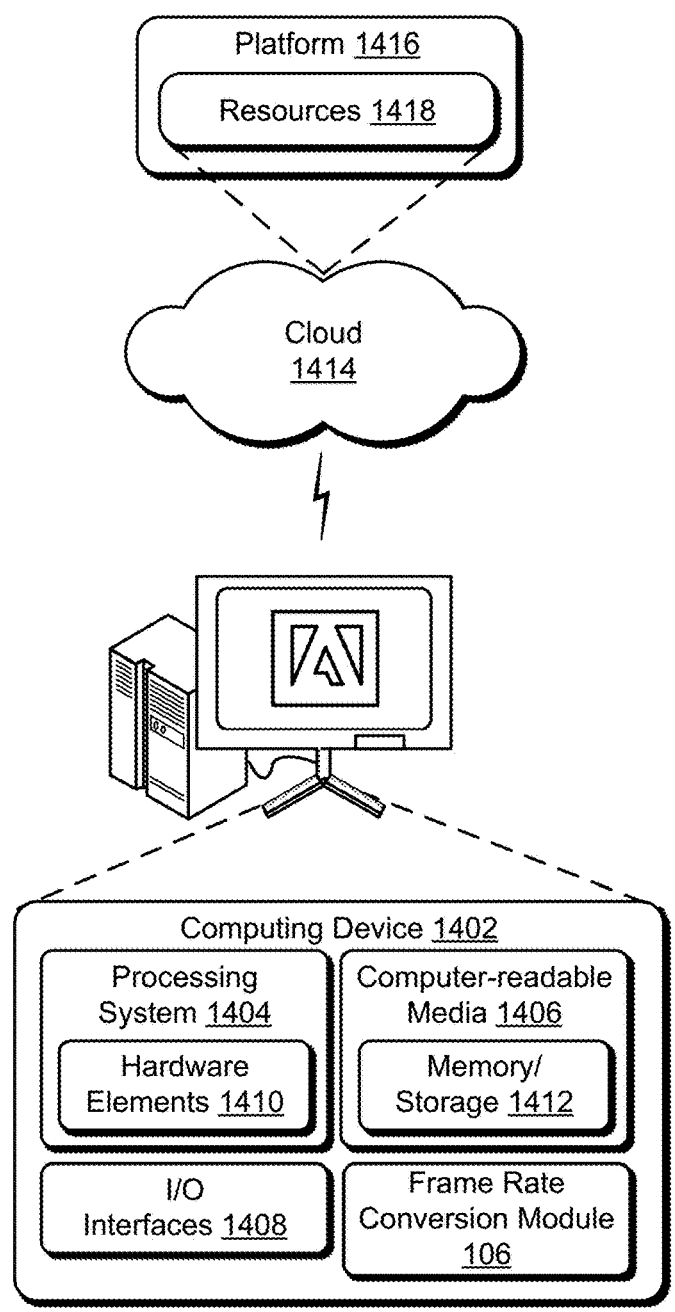
FIG. 14 illustrates an example system including various components of an example device that can be implemented as any type of computing device as described and/or utilized with reference to FIGS. 1-13 to implement embodiments of the techniques described herein.

FIG. 14 illustrates an example system generally at 1400 that includes an example computing device 1402 that is representative of one or more computing systems and/or devices that may implement the various techniques described herein. This is illustrated through inclusion of the frame rate conversion module 106. The computing device 1402 may be, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware elements 1410 that may be configured as processors, functional blocks, and so forth. This may also include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1406 is illustrated as including memory/storage 1412. The memory/storage 1412 represents memory/storage capacity associated with one or more computer-readable media. The memory/storage component 1412 may include volatile media (such as random access memory (RAM)) and/or nonvolatile media (such as read only memory (ROM), Flash memory, optical disks, magnetic disks, and so forth). The memory/storage component 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of a module that is executable by the computing device 1402 as software may be achieved at least partially in hardware, e.g., through use of computer-readable storage media and/or hardware elements 1410 of the processing system 1404. The instructions and/or functions may be executable/operable by one or more articles of manufacture (for example, one or more computing devices 1402 and/or processing systems 1404) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 may include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 may abstract resources and functions to connect the computing device 1402 with other computing devices. The platform 1416 may also serve to abstract scaling of resources to provide a corresponding level of scale to encountered demand for the resources 1418 that are implemented via the platform 1416. Accordingly, in an interconnected device embodiment, implementation of functionality described herein may be distributed throughout the system 1400. For example, the functionality may be implemented in part on the computing device 1402 as well as via the platform 1416 that abstracts the functionality of the cloud 1414.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment a method to convert a variable frame rate (VFR) video into a fixed frame rate video implemented by a computing device, the method comprising:
   obtaining, by the computing device, the VFR video comprising source frames with varying frame durations;
   determining, by the computing device, a fixed frame rate for the VFR video;
   generating, by the computing device, an initial mapping that maps the source frames of the VFR video to a sequence of result frames of the fixed frame rate;
   generating, by the computing device, an adjusted mapping to improve smoothness of motion of the VFR video by:
      scanning the mapping to locate at least one skipped source frame in the mapping;

scanning the mapping in a first direction from a skip location of the at least one skipped source frame to locate at least one repeated source frame;
computing a timing error which would occur if the mapping is adjusted by adding the skipped source frame at the skip location, removing the repeated source frame, and shifting sequential result frames between the skip location of the skipped source frame in the mapping and a repeat location of the repeated source frame in the mapping in the first direction; and
if the timing error is below a threshold, adjusting the mapping by adding the at least one skipped source frame at the skip location, removing the at least one repeated source frame, and shifting sequential result frames between the skip location of the skipped source frame in the mapping and the repeat location of the repeated source frame in the mapping in the first direction; and
converting, by the computing device, the VFR video into the fixed frame rate video having the determined fixed frame rate based on the adjusted mapping.

2. The method of claim 1, wherein the generating the initial mapping comprises:
selecting a source frame of the VFR video to map to the target result frame of the initial mapping using a mapping rule;
mapping the selected source frame to the target result frame; and
repeating the selecting and mapping for each target result frame.

3. The method of claim 2, wherein the mapping rule comprises selecting the corresponding source frame which occupies a longest duration relative to a duration of the target result frame.

4. The method of claim 2, wherein the mapping rule comprises selecting the source frame with a start time that is closest to a respective start time of the target result frame.

5. The method of claim 2, wherein the mapping rule comprises:
identifying a first source frame of the VFR video with a closest start time beginning prior to a start time of the target result frame and a second source frame with a closest start time beginning after the start time of the target result frame;
selecting the first source frame unless a first absolute value of a difference between start times of the second source frame and the target result frame is less than a second absolute value of a difference between start times of the first source frame and the target result frame and the first absolute value is less than an error tolerance; or
selecting the second source frame if the first absolute value of the difference between start times of the second source frame and the target result frame is less than the second absolute value of the difference between start times of the first source frame and the target result frame and the first absolute value is less than the error tolerance.

6. The method of claim 1, wherein generating the adjusted mapping further comprises:
if the at least one repeated source frame is not located responsive to scanning the initial mapping in the first direction, scanning the initial mapping in a second different direction starting from the skip location to find the at least one repeated source frame;
responsive to locating the at least one repeated source frame, computing a timing error which would occur if the initial mapping is adjusted by adding the at least one skipped source frame at the skip location, removing the at least one repeated source frame, and shifting sequential result frames between the skip location of the skipped source frame in the initial mapping and a repeat location of the repeated source frame in the mapping in the second direction; and
if the timing error is below an acceptable threshold, generating the adjusted mapping by adding the at least one skipped source frame at the skip location, removing the at least one repeated source frame, and shifting sequential result frames between the skip location of the skipped source frame in the initial mapping and a repeat location of the repeated source frame in the initial mapping in the second direction.

7. The method of claim 1, wherein the determining the fixed frame rate comprises:
determining an average frame duration of the source frames of the VFR video; and
determining the fixed frame rate by computing an inverse of the average frame duration of the source frames of the VFR video.

8. The method of claim 1, wherein the determining the fixed frame rate comprises:
identifying a source frame of the VFR video with a shortest frame duration; and
determining the fixed frame rate by computing an inverse of the shortest frame duration.

9. The method of claim 1, wherein the determining the fixed frame rate comprises determining a maximum or minimum n-sample moving average frame rate of the VFR video.

10. The method of claim 1, wherein the determining the fixed frame rate comprises selecting a standard fixed frame rate.

11. A system implemented in a digital medium environment to convert a variable frame rate (VFR) video into a fixed frame rate video, the system comprising:
at least one processor;
memory having stored thereon computer-readable instructions that are executable by the processor to implement frame rate conversion modules to perform operations comprising:
obtaining the VFR video comprising source frames with varying frame durations;
determining a fixed frame rate for the VFR video;
generating an initial mapping that maps the source frames of the VFR video to a sequence of result frames of the fixed frame rate;
generating an adjusted mapping to improve smoothness of motion of the VFR video by:
scanning the mapping to locate at least one skipped source frame in the mapping;
scanning the mapping in a first direction from a skip location of the at least one skipped source frame to locate at least one repeated source frame;
computing a timing error which would occur if the mapping is adjusted by adding the skipped source frame at the skip location, removing the repeated source frame, and shifting sequential result frames between the skip location of the skipped source frame in the mapping and a repeat location of the repeated source frame in the mapping in the first direction; and if the timing error is below a threshold, adjusting the mapping by adding the at least one skipped source frame at the skip location, removing the at least one repeated source frame, and shifting sequential result frames between the skip location of the skipped source frame in the mapping and the repeat location of the repeated source frame in the mapping in the first direction; and converting the VFR video into the fixed frame rate video having the fixed frame rate based on the adjusted mapping.

12. The system of claim 11, wherein the generating the initial mapping comprises:
selecting a source frame of the VFR video to map to the target result frame of the initial mapping using a mapping rule;
mapping the selected source frame to the target result frame; and
repeating the selecting and mapping for each target result frame.

13. The system of claim 12, wherein the mapping rule comprises selecting the corresponding source frame which occupies a longest duration relative to a duration of the target result frame.

14. The system of claim 12, wherein the mapping rule comprises selecting the source frame with a start time that is closest to a respective start time of the target result frame.

15. The system of claim 12, wherein the mapping rule comprises:
identifying a first source frame of the VFR video with a closest start time beginning prior to a start time of the target result frame and a second source frame with a closest start time beginning after the start time of the target result frame;
selecting the first source frame unless a first absolute value of the difference between start times of the second source frame and the target result frame is less than a second absolute value of the difference between start times of the first source frame and the target result frame and the first absolute value is less than an error tolerance; or
selecting the second source frame if the first absolute value of the difference between start times of the second source frame and the target result frame is less than the first absolute value of the difference between start times of the first source frame and the target result frame and first absolute value is less than the error tolerance.

16. The system of claim 12, wherein generating the adjusted mapping further comprises:
if the at least one repeated source frame is not located responsive to scanning the initial mapping in the first direction, scanning the initial mapping in a second different direction starting from the skip location to find the at least one repeated source frame;
responsive to locating the at least one repeated source frame, computing a timing error which would occur if the initial mapping is adjusted by adding the at least one skipped source frame at the skip location, removing the at least one repeated source frame, and shifting sequential result frames between the skip location of the skipped source frame in the initial mapping and a repeat location of the repeated source frame in the initial mapping in the second direction;

if the timing error is below an acceptable threshold, generating the adjusted mapping by adding the at least one skipped source frame at the skip location, removing the at least one repeated source frame, and shifting sequential result frames between the skip location of the skipped source frame in the initial mapping and a repeat location of the repeated source frame in the initial mapping in the second direction.

17. One or more computer-readable storage media comprising instructions stored thereon that, responsive to execution by a processor of a computing device, perform operations comprising:
obtaining a VFR video comprising source frames with varying frame durations;
determining a fixed frame rate for the VFR video;
generating an initial mapping that maps the source frames of the VFR video to a sequence of result frames of the fixed frame rate;
generating an adjusted mapping to improve smoothness of motion of the VFR video by:
scanning the mapping to locate at least one skipped source frame in the mapping;
scanning the mapping from a skip location of the at least one skipped source frame to locate at least one repeated source frame;
computing a timing error which would occur if the mapping is adjusted by adding the skipped source frame at the skip location, removing the repeated source frame, and shifting sequential result frames between the skip location of the skipped source frame in the mapping and a repeat location of the repeated source frame in the mapping; and
if the timing error is below a threshold, adjusting the mapping by adding the at least one skipped source frame at the skip location, removing the at least one repeated source frame, and shifting sequential result frames between the skip location of the skipped source frame in the mapping and the repeat location of the repeated source frame in the mapping; and
converting the VFR video into a fixed frame rate video having the determined fixed frame rate based on the adjusted mapping.

18. The one or more computer-readable storage media of claim 17, wherein the generating the initial mapping comprises:
selecting a source frame of the VFR video to map to the target result frame of the initial mapping using a mapping rule;
mapping the selected source frame to the target result frame; and
repeating the selecting and mapping for each target result frame.

19. The one or more computer-readable storage media of claim 18, wherein the mapping rule comprises selecting the corresponding source frame which occupies a longest duration relative to a duration of the target result frame.

20. The one or more computer-readable storage media of claim 18, wherein, wherein the mapping rule comprises selecting the source frame with a start time that is closest to a respective start time of the target result frame.

* * * * *